United States Patent [19]

Margittai

[11] Patent Number: 5,473,892

[45] Date of Patent: * Dec. 12, 1995

[54] APPARATUS FOR GENERATING HIGH PRESSURE FLUID IN RESPONSE TO WATER WEIGHT CHANGES CAUSED BY WAVES

[76] Inventor: Thomas B. Margittai, 778 Cornwall Dr., State College, Pa. 16801

[*] Notice: The portion of the term of this patent subsequent to Sep. 27, 2011, has been disclaimed.

[21] Appl. No.: 293,587

[22] Filed: Aug. 22, 1994

Related U.S. Application Data

[63] Continuation-in-part of Ser. No. 122,060, Sep. 15, 1993, Pat. No. 5,349,819.

[51] Int. Cl.⁶ .................................................. F16D 31/02
[52] U.S. Cl. ............................................. 60/398; 417/330
[58] Field of Search ............................... 60/398; 417/330; 290/42, 53

[56] References Cited

U.S. PATENT DOCUMENTS

| | | |
|---|---|---|
| 1,665,140 | 4/1928 | Master . |
| 3,353,787 | 11/1967 | Semo . |
| 3,817,662 | 6/1974 | Sterk . |
| 3,957,398 | 5/1976 | Lloyd . |
| 3,989,951 | 11/1976 | Lesster et al. . |
| 4,076,463 | 2/1978 | Welczer . |
| 4,078,382 | 3/1978 | Ricafranca et al. . |
| 4,091,618 | 5/1978 | Jackson . |
| 4,141,670 | 2/1979 | Russell . |
| 4,179,886 | 12/1979 | Tsubota . |
| 4,196,591 | 4/1980 | Wallace . |
| 4,203,294 | 5/1980 | Budal et al. . |
| 4,204,406 | 5/1980 | Hopfe . |
| 4,218,192 | 8/1980 | West . |
| 4,222,238 | 9/1980 | McCulloch . |
| 4,226,403 | 2/1981 | Hirbod . |
| 4,248,044 | 2/1981 | Woodilla . |
| 4,251,991 | 2/1981 | Wood . |
| 4,253,032 | 2/1981 | Lochner . |
| 4,271,668 | 6/1981 | McCormick . |
| 4,288,986 | 9/1981 | Watson . |
| 4,300,871 | 11/1981 | Laithwaite et al. . |
| 4,359,868 | 11/1982 | Slonim . |
| 4,369,374 | 1/1983 | Sandgänger . |

(List continued on next page.)

FOREIGN PATENT DOCUMENTS

| | | |
|---|---|---|
| 0070817 | 1/1983 | European Pat. Off. . |
| 2522073 | 8/1983 | France . |
| 3401273 | 7/1985 | Germany . |
| 101269 | 6/1983 | Japan . |
| 2033488 | 5/1980 | United Kingdom . |

OTHER PUBLICATIONS

Patent Abstracts of Japan, vol. 13, No. 369 (M–860) 16 Aug. 1989 & JP,A,11 025 407 (Shimizu Corp.) 17 May 1989.

Patent Abstracts of Japan, vol. 13, No. 311 (M–851) 17 Jul. 1989 & JP,A,11 000 384 (Mitsubishi Heavy Ind. Ltd.).

*Primary Examiner*—F. Daniel Lopez
*Attorney, Agent, or Firm*—Ratner & Prestia

[57] ABSTRACT

A fluid pressurizing unit for generating high pressure fluid by utilizing the water weight changes caused by the presence of a wave crest or wave trough directly above the apparatus. The apparatus is positioned under the surface of a body of water having waves and has a plunger having a flat disk at its upper end. The plunger moves vertically with respect to a rigidly mounted cylinder, which defines a fluid chamber having a cross sectional area less than the surface area of the flat disk. A conduit, in fluid communication with the fluid chamber, conducts water from the body of water, or fluid from an inlet tank, to the fluid chamber and pressurized fluid to a collection tank. Inlet and outlet check valves insure that fluid does not flow from the collection tank to the fluid chamber, or from the fluid chamber to the water source or inlet tank. Preferably, a plurality of such units are arranged hydraulically in parallel with one another. In this embodiment, a single collection tank collects pressurized fluid from the individual units.

20 Claims, 4 Drawing Sheets

U.S. PATENT DOCUMENTS

| | | |
|---|---|---|
| 4,383,413 | 5/1983 | Wells . |
| 4,398,095 | 8/1983 | Ono . |
| 4,408,454 | 10/1983 | Hagen et al. . |
| 4,408,455 | 10/1983 | Montgomery . |
| 4,412,417 | 11/1983 | Dementhon . |
| 4,441,316 | 4/1984 | Moody . |
| 4,490,621 | 12/1984 | Watabe et al. . |
| 4,599,858 | 7/1986 | La Stella et al. . |
| 4,603,551 | 8/1986 | Wood . |
| 4,622,473 | 11/1986 | Curry . |
| 4,627,240 | 12/1986 | Holmes . |
| 4,630,440 | 12/1986 | Meyerand . |
| 5,349,819 | 9/1994 | Margittai ................................. 60/398 |

APPARATUS FOR GENERATING HIGH PRESSURE FLUID IN RESPONSE TO WATER WEIGHT CHANGES CAUSED BY WAVES

This application is a continuation-in-part application of application Ser. No. 08/122,060 filed Sep. 15, 1993, U.S. Pat. No. 5,349,819.

FIELD OF THE INVENTION

The present invention relates to an underwater apparatus which generates high pressure fluid by responding to an increase in water weight above the apparatus in the presence of a wave crest above the apparatus and to a decrease in water weight above the apparatus in the presence of a wave trough above the apparatus.

BACKGROUND OF THE INVENTION

Efforts have been made to capture wave energy and transform it into a usable form. Many such efforts attempt to use the kinetic energy of a wave at the surface of the body of water. Such systems generally utilize floating devices which move vertically and/or horizontally with passing waves. This movement is typically transformed into a reciprocating motion to generate a usable form of energy.

An alternative is an "air turbine" type of wave-activated power generation system. In this type of system, an air box is anchored with its upper part above the surface of a body of water having waves. The air box has a lower opening below the surface of the body of water so that an air chamber is formed by the box and the water surface. By repeated vertical displacement of the water surface in the air chamber caused by waves, the air is alternately expelled from and sucked into the air chamber to generate a flow of air which in turn drives an air turbine connected to an electric power generator.

Recently, systems have been disclosed which make use of underwater pressure variations caused by changes in water weight due to the presence or absence of a wave crest above a particular location. U.S. Pat. Nos. 4,203,294, 4,222,238 and 4,630,440 disclose such systems. In particular, U.S. Pat. No. 4,203,294 at FIG. 6, discloses a system including a cylindrical wall member which moves vertically with respect to a fixed cylinder to generate pressurized fluid. However, in this embodiment, the device for generating electrical energy, a turbine, is contained within the apparatus itself. Thus, more than one of these devices could not be hydraulically connected in parallel, to draw unpressurized fluid from a common source and deliver pressurized fluid to a common collection tank.

SUMMARY OF THE INVENTION

The present invention is an apparatus and system for pressurizing fluid. The apparatus includes a stable base adapted to be positioned below the surface of a body of water having waves. A cylinder, defining a fluid chamber, is mounted to the base and is in fluid communication with a conduit which extends through the stable base and from which the fluid to be pressurized is drawn. A plunger, which is in sealed engagement with the inside of the cylinder, moves vertically relative to the cylinder and further defines the fluid chamber. A flat disk, disposed parallel to the surface of the body of water, is coupled to the upper end of the plunger and has a surface area greater than the cross sectional area of the fluid chamber. A flexible member is coupled to the base and the flat disk and encloses an air chamber, isolated from the fluid chamber. The air chamber is inflated with air sufficient to drive the plunger upward to an extended position in response to the presence of a wave trough above the flat disk, and sufficient to permit the plunger to be driven downward to a compressed position in response to the presence of a wave crest above the flat disk. An inlet check valve is disposed in the inlet portion of the conduit to permit fluid flow in only one direction, i.e. from the inlet portion of the conduit to the fluid chamber. Similarly, an outlet valve is disposed in the outlet portion of the conduit to permit fluid flow in only one direction, i.e. from the fluid chamber to the outlet portion of the conduit.

According to a first embodiment of the present invention, the hydraulic fluid is water from the body of water. According to this embodiment of the present invention, water from the body of water is conducted through the inlet portion of the conduit, to the fluid chamber, then to the outlet portion of the conduit, and subsequently to a collection tank. From the collection tank, the pressurized water may be delivered to a turbine, and subsequently returned to the body of water.

According to a second embodiment of the present invention, the hydraulic fluid is a fluid which is capable of lubricating the cylinder and plunger. Such fluids may include a mixture of water with glycerin, an alcohol or other suitable, water soluble additives. According to this embodiment of the present invention, fluid is conducted from an inlet tank, which is disposed outside of the fluid pressurizing unit, then through the inlet portion of the conduit, to the fluid chamber, to the outlet portion of the conduit, and subsequently to a collection tank. From the collection tank, the pressurized fluid may be delivered to a turbine, and subsequently returned, in a closed system, by way of a return conduit to the inlet tank.

In either the first or second embodiments of the present invention, a plurality of such fluid pressurizing units are preferably hydraulically connected in parallel. The units need not be arranged in an ordered pattern. A common source of unpressurized fluid, such as the body of water itself or an inlet tank, feeds all of the units, and the units conduct pressurized fluid to a common collection tank.

The apparatus of the present invention can have an air valve, disposed within the flat disk, for permitting inflation and deflation of the air chamber. Seals can be used to couple the flexible member to the base and the flat disk. Preferably, the surface area of the flat disk is substantially greater than the cross-sectional area of the fluid chamber. For example, the surface area of the flat disk could be five to twenty greater than the cross-sectional area of the fluid chamber, depending on local conditions.

According to an aspect of the invention, the lower end of the plunger has an annular element which has a groove, in which is placed an O-ring to contact the inside of the cylinder for sealing the piston with the inside of the cylinder. Also, the cylinder has an annular element at its top end, similarly having a groove in which is placed an annular O-ring to contact and seal against the piston. The annular element of the plunger abuts against the annular element of the cylinder when the apparatus is in its extended position to prevent the plunger from disengaging from the cylinder.

BRIEF DESCRIPTION OF THE DRAWINGS

The invention is best understood from the following detailed description when read in connection with the accompanying drawings, in which.

DETAILED DESCRIPTION OF THE INVENTION

Figure 1A:
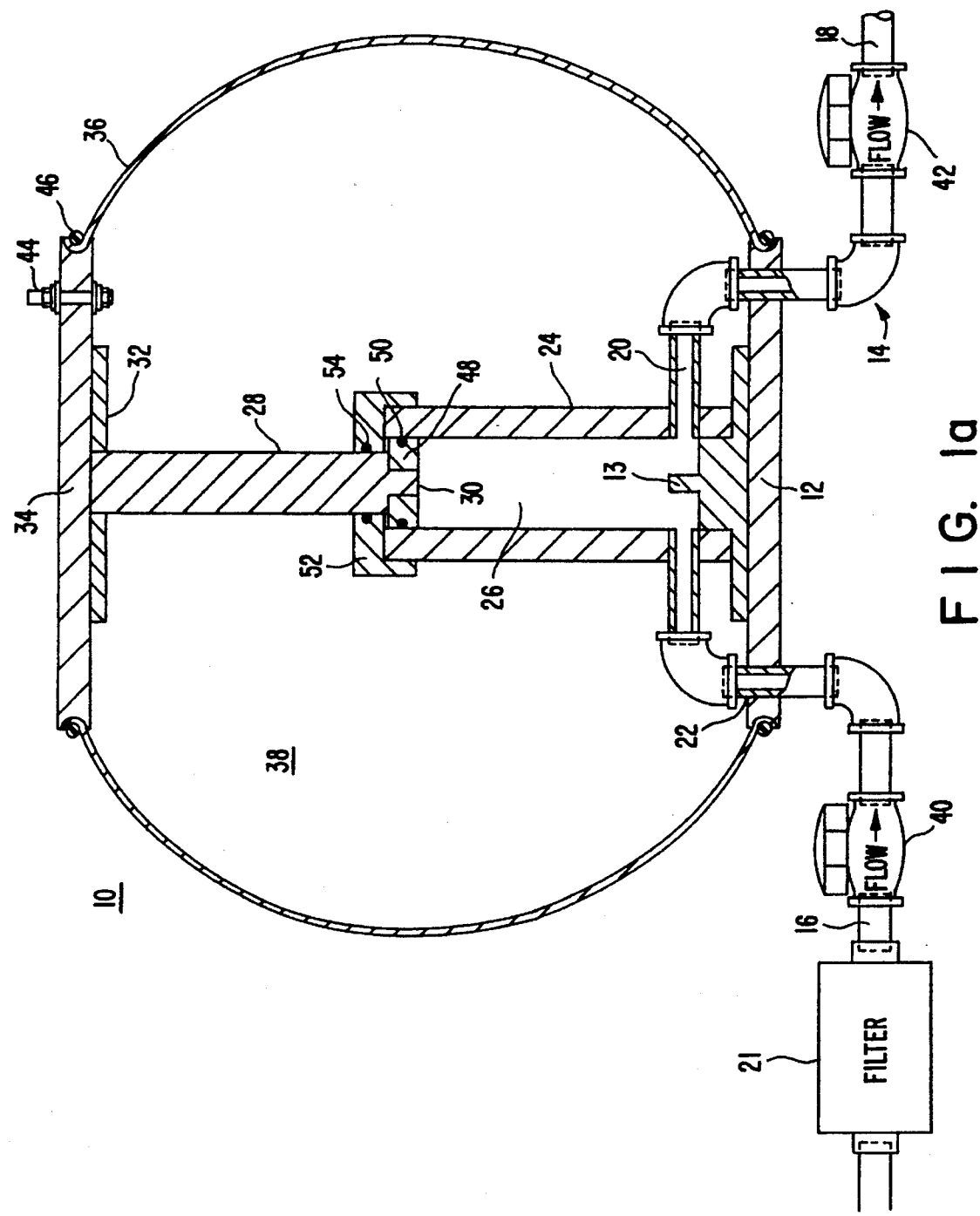
FIG. 1a is a partial cross sectional view of the apparatus of the present invention showing the apparatus in its extended position.
Figure 1B:
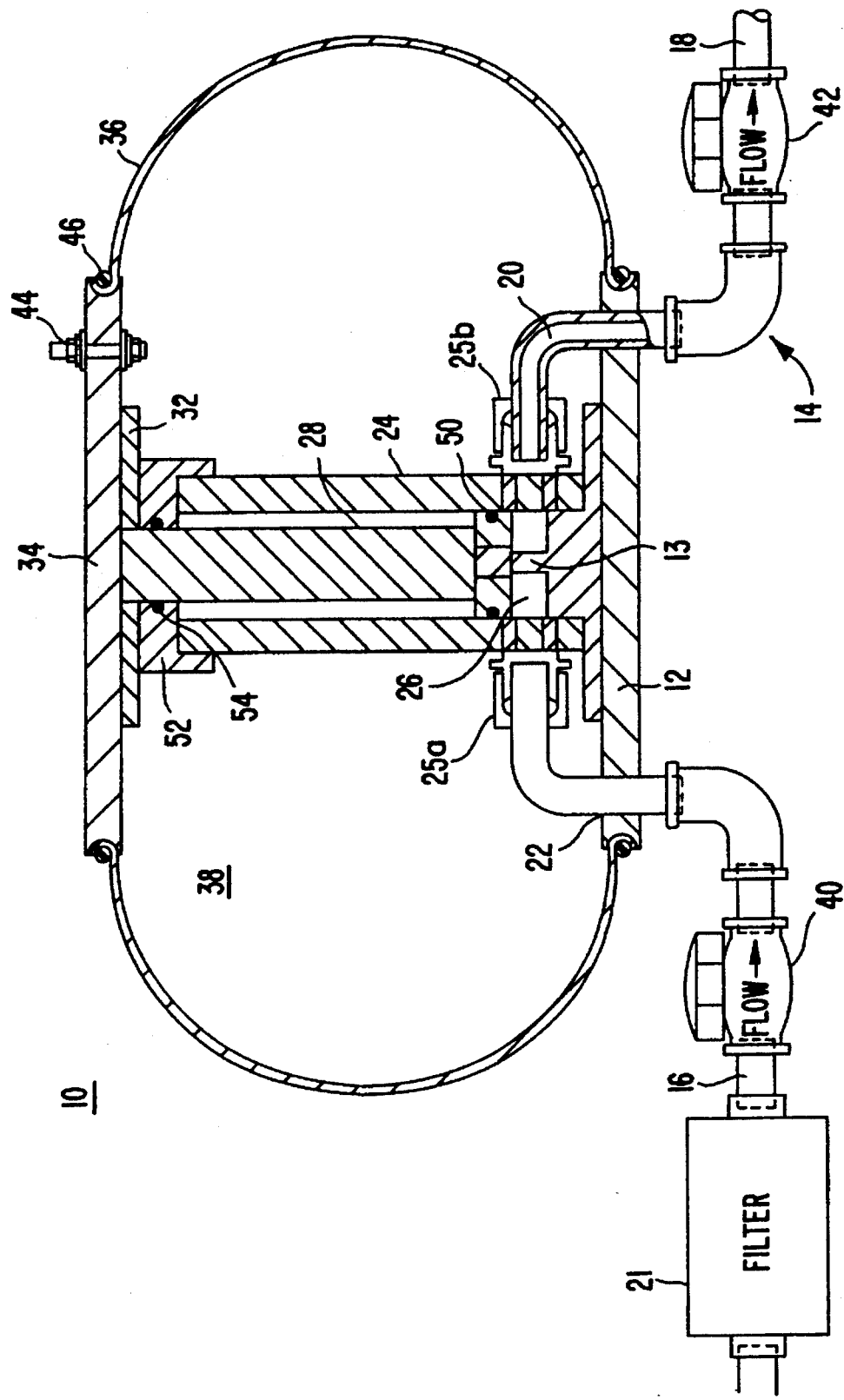
FIG. 1b is a partial cross sectional view of the apparatus of the present invention showing the apparatus in its compressed position.

Referring now to the drawings, wherein like reference numerals refer to like elements throughout, FIGS. 1a and 1b show a fluid pressurizing unit 10, with FIG. 1a showing the fluid pressurizing unit in its extended position and FIG. 1b showing the fluid pressurizing unit in its compressed position. During operation, fluid pressurizing unit 10 is disposed under a body of water having waves, such as an ocean, a bay or a lake. The extended position of the fluid pressurizing unit 10 occurs when a wave trough (the lowest point of a wave) is directly over the fluid pressurizing unit. The compressed position of the fluid pressurizing unit 10 occurs when a wave crest (the highest point of a wave) is directly above the fluid pressurizing unit. Fluid pressurizing unit 10 may assume various intermediate positions based upon the water weight above the unit.

The fluid pressurizing unit 10 includes a stable base 12, which is positioned below the surface of the water having waves. By "stable", it is meant that this base is not moved in any direction by underwater currents. To achieve this level of stability, the base is secured, in a known manner (not shown), either directly to the floor of the body of water or to another element which would permit the stable base to resist movement in either the horizontal or vertical directions. The material of base 12 should be corrosion resistant and should be of sufficient structural strength and dimensions to withstand the forces caused by underwater currents and caused by the fluid pressurizing unit itself.

A conduit 14 extends through base 12 and includes an inlet portion 16, an outlet portion 18 and a central portion 20 between inlet portion 16 and outlet portion 18. Appropriate conduits, or fluid conducting means, include hoses, such as plastic hoses. Inlet portion 16 is in fluid communication with a source of unpressurized fluid, such as the body of water itself or an inlet tank containing a fluid. As used herein, the term "unpressurized" in this context means that the fluid is present in the source of unpressurized fluid in its natural state, either as water in the body of water at a given depth or as fluid in an inlet tank. It should be recognized that the fluid in the source of unpressurized fluid might have a pressure above atmospheric, depending on the depth in the body of water or the internal pressure of the inlet tank. Nonetheless, the fluid in the source of unpressurized fluid is considered "unpressurized" because such fluid has not been pressurized by a fluid pressurizing unit in a particular fluid flow cycle through the fluid pressurizing unit.

If the body of water itself is used as the water source according to the first embodiment of the present invention, a filter 21 should be disposed within inlet portion 16, to prevent the introduction of impurities into the system without unduly hindering the flow of water. Such a filter is preferably easily replaceable and/or easy to clean. On the other hand, if an inlet tank is used as a fluid source and a closed system is used according to the second embodiment of the present invention, then a filter, such as filter 21, is not needed. Outlet portion 18 leads to a collection tank 60 (see FIG. 2), which collects the pressurized fluid.

Central portion 20 is in fluid communication with a fluid chamber 26, which is defined by a cylinder 24 mounted to base 12. As shown in FIG. 1b, a compression fitting 25a is placed over conduit 14 at its entry to cylinder 24 to ensure a tight seal. A similar compression fitting 25b is placed at the exit of conduit 14 from cylinder 24. Cylinder 24 is rigidly mounted to base 12 and, by virtue of being rigidly mounted to base 12, does not move either vertically or horizontally, despite being subjected to underwater currents.

Fluid chamber 26 is further defined by the lower end 30 of a plunger 28. Plunger 28 is capable of vertical movement relative to cylinder 24, and is in sealing engagement with the inner surface of cylinder 24. In FIG. 1a, plunger 28 is shown in its fully extended position relative to cylinder 24 and the volume of fluid chamber 26 is at a maximum. In FIG. 1b, plunger 28 is shown in its fully compressed position so that lower end 30 is in abutment with a protrusion 13. At this lowermost position, the volume of fluid chamber 26 is at a minimum.

A flat disk 34 is attached to the upper end 32 of plunger 28. Flat disk 34 is disposed parallel to the surface of the body of water. Flat disk 34 has a surface area greater than the cross-sectional area of fluid chamber 26. This difference in area creates a pressure multiplier effect. Preferably, flat disk 34 has a surface area substantially greater than the cross-sectional area of fluid chamber 26. For example, the surface area of flat disk 34 could be five to twenty times greater than the cross-sectional area of fluid chamber 26, depending on local conditions. Flat disk 34 is vertically movable with plunger 28. Also, for the upper end 32 of plunger 28 is in the form of a flange which facilitates the mounting of flat disk 34 onto plunger 28.

A flexible member 36 is coupled to base 12 and flat disk 34 and encloses an air chamber 38, which is isolated from fluid chamber 26. Flexible member 36 could be envisioned as a hollow rubber ball with a shaved top and a shaved bottom. This ball is then sealingly engaged with flat disk 34 at its top and base 12 at its bottom.

An inlet check valve 40 is disposed in the inlet portion 16 of conduit 14. Inlet check valve 40 permits fluid flow from the body of water or inlet tank to fluid chamber 26 as plunger 28 is moved upward and prevents fluid flow from fluid chamber 26 to the body of water or inlet tank as plunger 28 is moved downward. Also, an outlet check valve 42 is disposed in the outlet portion 18 of conduit 14. Outlet check valve 42 permits fluid flow from fluid chamber 26 to the collection tank as plunger 28 is moved downward and prevents fluid flow from the collection tank to fluid chamber 26 as plunger 28 is moved upward. Any other appropriate flow control device could be used in place of inlet check valve 40 and outlet check valve 42.

An air valve 44 can be provided and extends through flat disk 34 for permitting inflation and deflation of air chamber 38. Air valve 44 is adapted for connection with any conventional air pump. After inflation, air valve 44 includes means for sealing air chamber 38 from the environment.

A plurality of seals 46 are provided for coupling flexible member 36 with base 12 and with flat disk 34. The seals should be of sufficient sealing integrity to prevent any leakage from air chamber 38 to the body of water or inlet tank during operation of the fluid pressurizing unit 10.

The lower end 30 of plunger 38 preferably has an annular element 48 which extends radially outward of the remainder of plunger 28 and has a groove at its radial outer surface. An O-ring 50 is placed in the groove and is in contact with the inside of cylinder 24 in order to sealingly engage plunger 28 with the inside of cylinder 24.

For the embodiment of the invention being described, cylinder 24 has an annular element 52, at its top end. At its radial inner surface, annular element 52 has a groove. An O-ring 54 is placed in the groove and is in contact with the outer surface of plunger 28.

Annular element 48 of plunger 28 abuts against annular element 52 of cylinder 24 when the fluid pressurizing unit is in its extended position. Thus, annular element 52 prevents plunger 28 from moving completely out of cylinder 24.

The fluid pressurizing unit operates in response to the changes in water weight, above the fluid pressurizing unit, caused by waves. For example, when a wave crest is above the fluid pressurizing unit, there is a greater amount of water above the fluid pressurizing unit, which increases the pressure on flat disk 34. On the other hand, when a wave trough is directly above the fluid pressurizing unit, there is a decreased weight of water above the fluid pressurizing unit and a corresponding lower water pressure acting on flat disk 34. The passing of waves over the fluid pressurizing unit results in a vertical movement of plunger 28, which pressurizes the fluid in fluid chamber 26 and, therefore, the fluid in conduit 14 leading to the collection tank. The plunger need not move to its fully extended position and to its fully compressed position in order to operate; only some degree of vertical movement is required to pressurize the fluid in fluid chamber 26.

In order to take advantage of the varying water weight above a fluid pressurizing unit, flexible member 36 is inflated with air to a pressure sufficient to drive the plunger 28 upward to its extended position in the presence of a wave trough above flat disk 34 and to permit plunger 28 to be driven downward to its compressed position in response to the presence of a wave crest above flat disk 34. Such inflation of flexible member 36 creates a unit having a variable resistance; the resistance increases as the downward force on the fluid pressurizing unit increases. The pressure required depends on a number of conditions, including the surface area of flat disk 34, the resiliency of flexible member 36, and the depth at which base 12 is rigidly mounted under the water. As an alternative to air pressure, a spring or other device having a variable resistance can be used. As with flexible member 34, such other device would extend between base 12 and flat disk 34.

Figure 2:
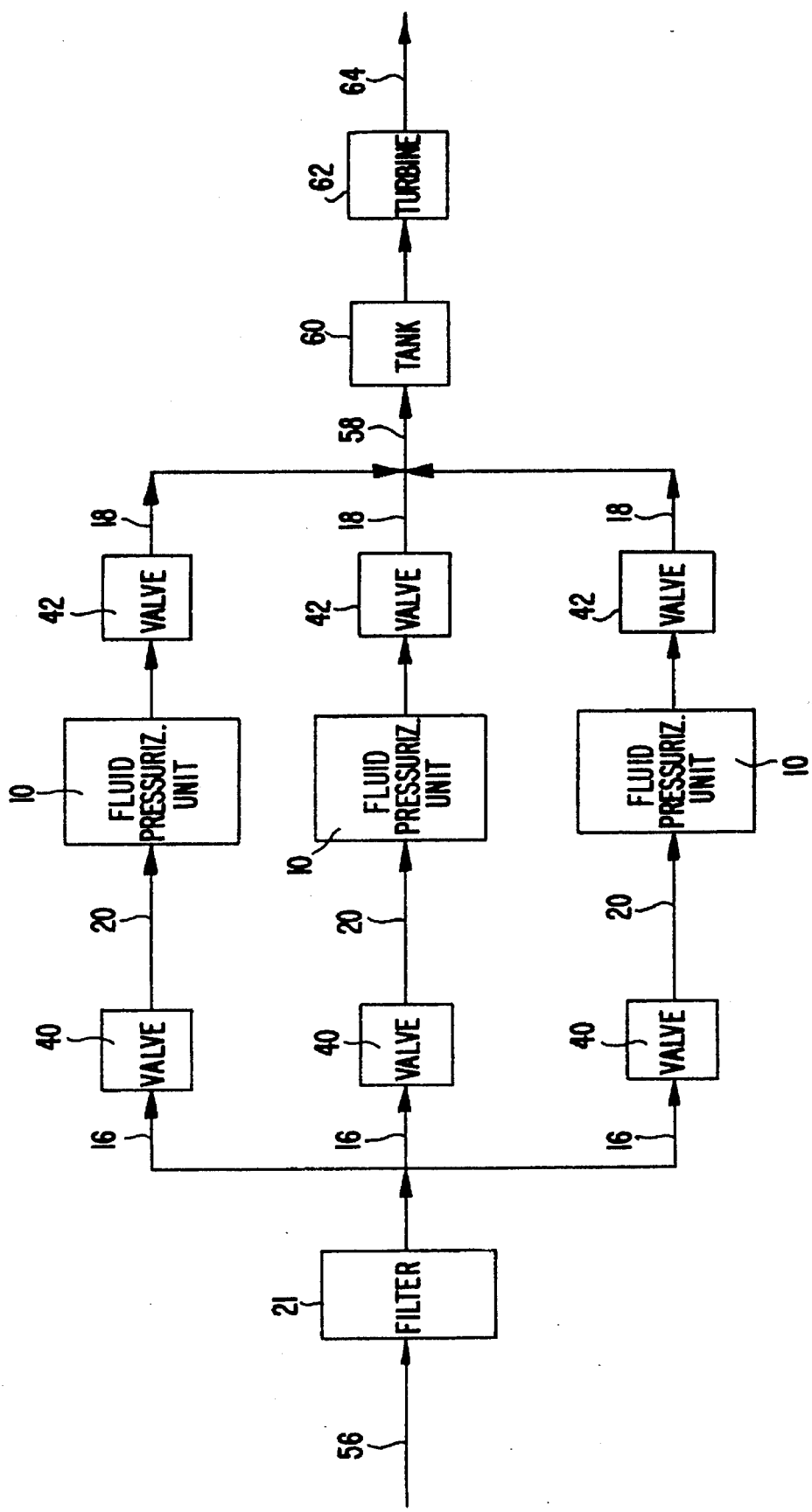
FIG. 2 is a block diagram of the first embodiment of the present invention showing a plurality of fluid pressurizing units hydraulically connected in parallel.

FIG. 2 is a block diagram of the first embodiment of the present invention and shows a plurality of fluid pressurizing units hydraulically connected in parallel. This embodiment of the invention permits greater amounts of pressurized water to be generated more quickly. For example, a large number of units, such as several hundred or more, can be hydraulically arranged in parallel. The physical alignment or location of the units relative to one another can be random; the units need not be aligned in an ordered pattern to generate high pressure water.

FIG. 2 shows a master inlet conduit 56 which conducts water from the body of water and feeds it to a plurality of inlet portions 16 of conduits 14. Within each inlet portion 16 is an inlet check valve 40, as previously described. Central portions 20 of conduits 14 are in fluid communication with the fluid chambers of fluid pressurizing units 10, also as previously described. Outlet portions 18 extend from fluid pressurizing units 10 and each includes an outlet check valve 42 disposed therein.

Each of the outlet portions 18 leads to a single master outlet conduit 58. Master outlet conduit 58 conducts pressurized water to a collection tank 60. Collection tank 60 may be at ground level, in which case the energy is stored as high pressure water. Alternatively, collection tank 60 may be at an elevated altitude, in which case a greater percentage of the energy is stored as potential energy.

Water from collection tank 60 can be fed to a conventional turbine 62. The energy from the water of collection tank 60 is imparted to turbine 62 in a known manner in order to turn the turbine. In this way, the turbine converts the energy of the water to electrical energy. The water which has already been used to turn turbine 62 is then discharged through a discharge pipe 64 back to the body of water.

Figure 3:
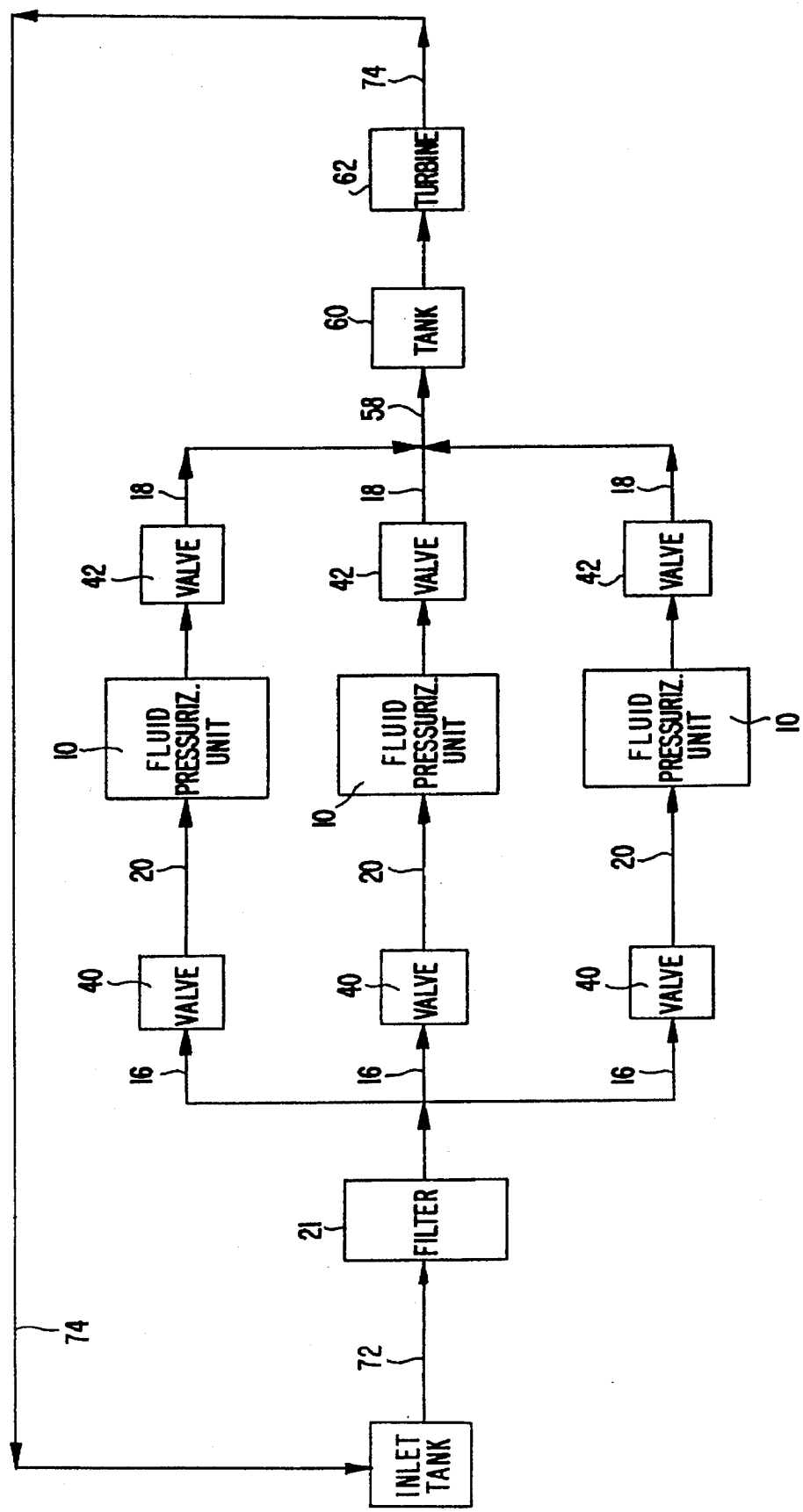
FIG. 3 is a block diagram of the second embodiment of the present invention showing a plurality of fluid pressurizing units hydraulically connected in parallel.

FIG. 3 is a block diagram of the second embodiment of the present invention and shows a plurality of fluid pressurizing units hydraulically connected in parallel, in a manner similar to the first embodiment shown in FIG. 2. As in the first embodiment, this embodiment of the invention permits greater amounts of pressurized fluid to be generated more quickly. For example, a large number of units, such as several hundred or more, can be hydraulically arranged in parallel. The physical alignment or location of the units relative to one another can be random; the units need not be aligned in an ordered pattern to generate high pressure fluid.

Most of the embodiment shown in FIG. 3 is the same as that shown in FIG. 2. For example, within each inlet portion 16 of conduits 14 is an inlet check valve 40, as previously described. Central portions 20 of conduits 14 are in fluid communication with the fluid chambers of fluid pressurizing units 10, also as previously described. Outlet portions 18 extend from fluid pressurizing units 10 and each includes an outlet check valve 42 disposed therein. Each of the outlet portions 18 leads to a single master outlet conduit 58. Master outlet conduit 58 conducts pressurized fluid to a collection tank 60. Collection tank 60 may be at ground level, in which case the energy is stored as high pressure fluid. Alternatively, collection tank 60 may be at an elevated altitude, in which case a greater percentage of the energy is stored as potential energy.

As in the embodiment shown in FIG. 2, fluid from collection tank 60 can be fed to a conventional turbine 62. The energy from the fluid of collection tank 60 is imparted to turbine 62 in a known manner in order to turn the turbine. In this way, the turbine converts the energy of the fluid to electrical energy.

According to the embodiment shown in FIG. 3, the hydraulic fluid is a fluid which is capable of lubricating the cylinder and plunger. Such fluids include glycerin, an alcohol or a mixture of water and a detergent. The fluid is conducted from inlet tank 76 by an inlet conduit 72 which conducts the fluid to the plurality of inlet portions 16 of conduits 14. As in the first embodiment shown in FIG. 2, a filter 21 may be disposed in inlet conduit 72 to ensure that no impurities enter the fluid pressurizing units 10. The filter is optional in this embodiment, however, because the pressure fluid flows in a closed system.

According to the embodiment shown in FIG. 3, the fluid which has already been used to turn turbine 62 is then returned through a return conduit 74 back to inlet tank 76. In this manner, the pressure fluid is maintained in a closed system. Both the inlet tank 76 and the collection tank 60 are disposed outside of the fluid pressurizing units 10.

Although illustrated and described herein with reference to certain specific embodiments., the claims of the present invention are nevertheless not intended to be limited to the details illustrated and described. Rather, the claims are meant to cover various common modifications without departing from the spirit of the invention.

What is claimed:

1. An apparatus for pressurizing fluid from a source of unpressurized fluid and collecting the pressurized fluid in a collection tank, said apparatus comprising:
   a stable base adapted to be positioned below the surface of a body of water having waves;
   a cylinder mounted to said base and defining a fluid chamber having a cross-sectional area;
   fluid conducting means for conducting fluid from the source of unpressurized fluid to the collection tank and having:
   (a) an inlet portion adapted for conducting fluid from the source of unpressurized fluid,
   (b) an outlet portion adapted for conducting fluid to the collection tank, and
   (c) a central portion disposed between said inlet portion and said outlet portion and in fluid communication with said fluid chamber;
   a plunger movable within said cylinder and sealingly engaging the inside of said cylinder and having:
   (a) a lower end which further defines said fluid chamber, and
   (b) an upper end;
   a flat disk, having a surface area greater than said cross-sectional area of said fluid chamber, disposed parallel to the surface of the body of water and coupled to said upper end of said plunger;
   means for:
   (a) driving said plunger upward to an extended position in response to the presence of a wave trough above said flat disk, and
   (b) permitting said plunger to be driven downward to a compressed position in response to the presence of a wave crest above said flat disk;
   first flow control means, disposed in the inlet portion of said fluid conducting means, for:
   (a) permitting fluid flow from the source of unpressurized fluid to said fluid chamber as said plunger is moved upward, and
   (b) preventing fluid flow from said fluid chamber to the source of unpressurized fluid as said plunger is moved downward; and
   second flow control means, disposed in the outlet portion of said fluid conducting means, for:
   (a) permitting fluid flow from said fluid chamber to the collection tank as said plunger is moved downward, and
   (b) preventing fluid flow from the collection tank to said fluid chamber as said plunger is moved upwards.

2. An apparatus in accordance with claim 1, wherein said means for driving said plunger upward and for permitting said plunger to be driven downward extend between said base and said flat disk.

3. An apparatus for pressurizing fluid from a source of unpressurized fluid and collecting the pressurized fluid in a collection tank, said apparatus comprising:
   a stable base adapted to be positioned below the surface of a body of water having waves;
   a cylinder mounted to said base and defining a fluid chamber having a cross-sectional area;
   a conduit, extending through said base, for conducting fluid from the source of unpressurized fluid to the collection tank and having:
   (a) an inlet portion adapted for conducting fluid from the source of unpressurized fluid,
   (b) an outlet portion adapted for conducting fluid to the collection tank, and
   (c) a central portion disposed between said inlet portion and said outlet portion and in fluid communication with said fluid chamber;
   a plunger movable within said cylinder and sealingly engaging the inside of said cylinder and having:
   (a) a lower end which further defines said fluid chamber, and
   (b) an upper end;
   a flat disk, having a surface area greater than said cross-sectional area of said fluid chamber, disposed parallel to the surface of the body of water and coupled to said upper end of said plunger;
   a flexible member coupled to said base and said flat disk and enclosing an air chamber isolated from said fluid chamber and inflated with air to a pressure sufficient to:
   (a) drive said plunger upward to an extended position in response to the presence of a wave trough above said flat disk, and
   (b) permit said plunger to be driven downward to a compressed position in response to the presence of a wave crest above said flat disk;
   an inlet check valve, disposed in the inlet portion of said conduit, having means for:
   (a) permitting fluid flow from the source of unpressurized fluid to said fluid chamber as said plunger is moved upward, and
   (b) preventing fluid flow from said fluid chamber to the source of unpressurized fluid as said plunger is moved downward; and
   an outlet check valve, disposed in the outlet portion of said conduit, having means for:
   (a) permitting fluid flow from said fluid chamber to the collection tank as said plunger is moved downward, and
   (b) preventing fluid flow from the collection tank to said fluid chamber as said plunger is moved upwards.

4. An apparatus in accordance with claim 3 further comprising an air valve, disposed within said flat disk, for permitting inflation and deflation of said air chamber.

5. An apparatus in accordance with claim 3 further comprising a plurality of seals for coupling said flexible member to said base and said flat disk.

6. An apparatus in accordance with claim 3, wherein said surface area of said flat disk is substantially greater than said cross-sectional area of said fluid chamber.

7. An apparatus in accordance with claim 3, wherein:
   said plunger has (a) a first annular element at said lower end of said plunger and having a first groove, and (b) a first O-ring in said first groove in contact with the inside of said cylinder for sealingly engaging said plunger with said cylinder; and
   said cylinder has (a) a top end formed as a second annular element having a second groove, and (b) a second O-ring in said second groove in contact with said piston.

8. An apparatus in accordance with claim 3 further comprising a filter, disposed in said inlet portion of said conduit, for preventing the introduction of impurities.

9. A system for collecting pressurized fluid comprising:

a source of unpressurized fluid;

a collection tank for collecting pressurized fluid; and a plurality of fluid pressurizing units, hydraulically connected in parallel with one another and each comprising:
(a) a stable base adapted to be positioned below the surface of a body of water having waves,
(b) a cylinder mounted to said base and defining a fluid chamber having a cross-sectional area,
(c) a conduit, extending through said base, for conducting fluid from the source of unpressurized fluid to the collection tank and having:
(i) an inlet portion adapted for conducting fluid from the source of unpressurized fluid,
(ii) an outlet portion adapted for conducting fluid to the collection tank, and
(iii) a central portion disposed between said inlet portion and said outlet portion and in fluid communication with said fluid chamber,
(d) a plunger movable within said cylinder and sealingly engaging the inside of said cylinder and having:
(i) a lower end which further defines said fluid chamber, and
(ii) an upper end,
(e) a flat disk, having a surface area greater than said cross-sectional area of said fluid chamber, disposed parallel to the surface of the body of water and coupled to said upper end of said plunger,
(f) a flexible member coupled to said base and said flat disk and enclosing an air chamber isolated from said fluid chamber and inflated with air to a pressure sufficient to:
(i) drive said plunger upward to an extended position in response to the presence of a wave trough above said flat disk, and
(ii) permit said plunger to be driven downward to a compressed position in response to the presence of a wave crest above said flat disk,
(g) an inlet check valve, disposed in the inlet portion of said conduit, having means for:
(i) permitting fluid flow from the source of unpressurized fluid to said fluid chamber as said plunger is moved upward, and
(ii) preventing fluid flow from said fluid chamber to the source of unpressurized fluid as said plunger is moved downward, and
(h) an outlet check valve, disposed in the outlet portion of said conduit, having means for:
(i) permitting fluid flow from said fluid chamber to said collection tank as said plunger is moved downward, and
(ii) preventing fluid flow from said collection tank to said fluid chamber as said plunger is moved upwards.

10. A system in accordance with claim 9, wherein each of said fluid pressurizing units further comprises an air valve, disposed within said flat disk, for permitting inflation and deflation of said air chamber.

11. A system in accordance with claim 9, wherein each of said fluid pressurizing units further comprises a plurality of seals for coupling said flexible member to said base and said flat disk.

12. A system in accordance with claim 9, wherein the surface area of said flat disk is substantially greater than the cross-sectional area of said fluid chamber.

13. A system in accordance with claim 9, wherein said collection tank is disposed at an elevated altitude.

14. A system in accordance with claim 9 further comprising:

an inlet conduit, in fluid communication with each of said inlet portions, for conducting fluid from the source of unpressurized fluid to said inlet portions; and a master outlet conduit, in fluid communication with each of said outlet portions, for conducting fluid from said outlet portions to said collection tank.

15. A system in accordance with claim 14 wherein the source of unpressurized fluid is an inlet tank.

16. A system in accordance with claim 15 further comprising a filter, disposed in said inlet conduit, for preventing the introduction of impurities.

17. A system in accordance with claim 15 further comprising:

a turbine, in fluid communication with said collection tank, for generating electric energy; and a return conduit, in fluid communication with said turbine, for conducting fluid from said turbine to the inlet tank.

18. A system in accordance with claim 17, wherein said inlet tank, said inlet conduit, said conduit having the inlet portion, the outlet portion, and the central portion, said master outlet conduit, said collection tank, said turbine, and said return conduit form a closed system through which said fluid flows.

19. A system in accordance with claim 15, wherein:

said inlet tank is disposed outside of said plurality of fluid pressurizing units; and said collection tank is disposed outside of said plurality of fluid pressurizing units.

20. An apparatus for pressurizing fluid from an inlet tank and collecting the pressurized fluid in a collection tank, said apparatus comprising:

a stable base adapted to be positioned below the surface of a body of water having waves;

a cylinder mounted to said base and defining a fluid chamber having a cross-sectional area;

fluid conducting means, for conducting fluid from the inlet tank to the collection tank and having:
(a) an inlet portion adapted for conducting fluid from the inlet tank,
(b) an outlet portion adapted for conducting fluid to the collection tank, and
(c) a central portion disposed between said inlet portion and said outlet portion and in fluid communication with said fluid chamber;

a plunger movable within said cylinder and sealingly engaging the inside of said cylinder and having:
(a) a lower end which further defines said fluid chamber, and
(b) an upper end;

a flat disk, having a surface area greater than said cross-sectional area of said fluid chamber, disposed parallel to the surface of the body of water and coupled to said upper end of said plunger;

means for:
(a) driving said plunger upward to an extended position in response to the presence of a wave trough above said flat disk, and
(b) permitting said plunger to be driven downward to a compressed position in response to the presence of a wave crest above said flat disk;

first flow control means, disposed in the inlet portion of said fluid conducting means, for:
  (a) permitting fluid flow from the inlet tank to said fluid chamber as said plunger is moved upward, and
  (b) preventing fluid flow from said fluid chamber to the inlet tank as said plunger is moved downward; and second flow control means, disposed in the outlet portion of said fluid conducting means, for:
  (a) permitting fluid flow from said fluid chamber to the collection tank as said plunger is moved downward, and
  (b) preventing fluid flow from the collection tank to said fluid chamber as said plunger is moved upwards.

* * * * *